United States Patent
Bredemeier

[15] 3,659,613
[45] May 2, 1972

[54] LASER ACCESSORY FOR SURGICAL APPLICATION

[72] Inventor: Herbert C. Bredemeier, Sherborn, Mass.
[73] Assignee: American Optical Corporation, Southbridge, Mass.
[22] Filed: June 30, 1969
[21] Appl. No.: 837,690

[52] U.S. Cl. ............................................. 128/395, 331/94.5
[51] Int. Cl. ....................................................... A61n 5/00
[58] Field of Search ........................... 128/395–398, 303.1, 128/6–9; 350/81

[56] References Cited

UNITED STATES PATENTS

| | | | |
|---|---|---|---|
| 2,930,379 | 3/1960 | Dopp et al. | 128/396 |
| 3,096,767 | 7/1963 | Gresser et al. | 128/395 |
| 3,136,310 | 6/1964 | Meltzer | 128/398 X |
| 3,256,875 | 6/1966 | Tsepelev et al. | 128/8 |
| 3,315,680 | 4/1967 | Silbertrust et al. | 128/395 |
| 3,348,547 | 10/1967 | Kavanagh | 128/395 |
| 3,393,372 | 7/1968 | Vickery et al. | 331/94.5 |
| 3,456,651 | 7/1969 | Smart | 128/395 X |
| 3,487,835 | 1/1970 | Koester et al. | 128/303.1 |
| 3,525,332 | 8/1970 | Kosaka | 128/6 |

OTHER PUBLICATIONS

Yahr, W. Z., et al., Journ. of Assoc. for Advancement of Med. Instrumentation, Sept.–Oct. 1966, pp. 28–31.

Primary Examiner—Richard A. Gaudet
Assistant Examiner—Kyle L. Howell
Attorney—William C. Nealon, Nobel S. Williams and Robert J. Bird

[57] ABSTRACT

A surgical laser accessory construction comprising an elongated tubular member defining an unobstructed path for conducting optical energy to a relatively inaccessible location within a body cavity and optical means for directing the infrared radiation of a $CO_2$ pulsed laser to a location within said body cavity while providing visible light to be directed to said body cavity location and for allowing an operator of the device at such times to continuously monitor said location within the body cavity during treatment by the laser radiation, said optical means including a rotatable disc for enabling the laser energy at substantially full strength to be directed to said body location and said location simultaneously viewed in visible light by the operator of the device. The construction also includes means for changing the body cavity location being treated as well as pressurized housing means for enabling air to be directed under pressure into said body cavity.

5 Claims, 11 Drawing Figures

Patented May 2, 1972     3,659,613
3 Sheets-Sheet 1
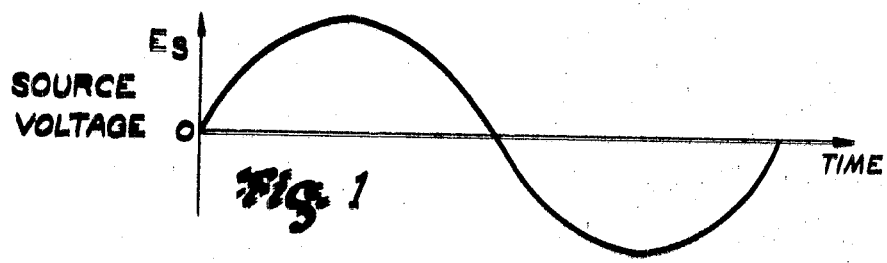
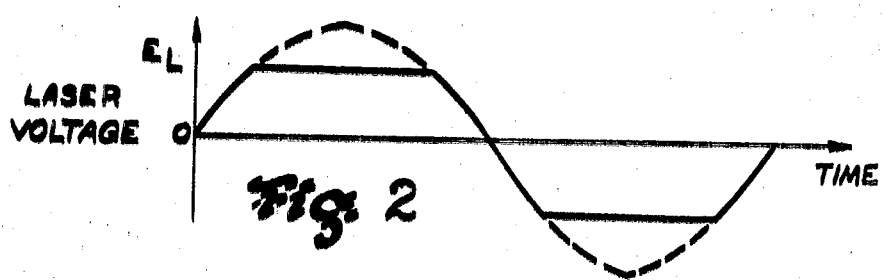
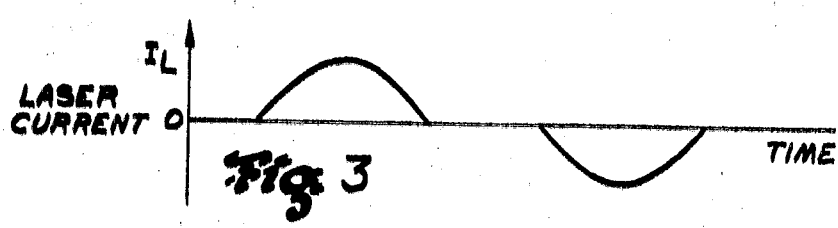
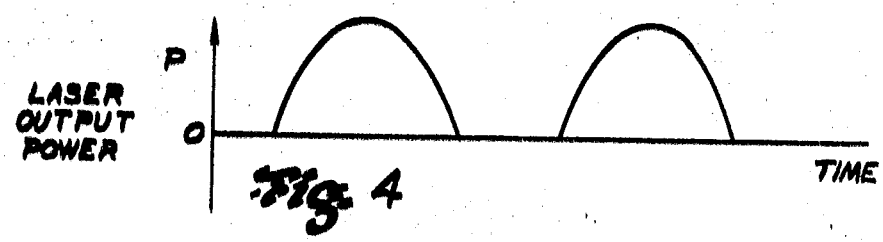
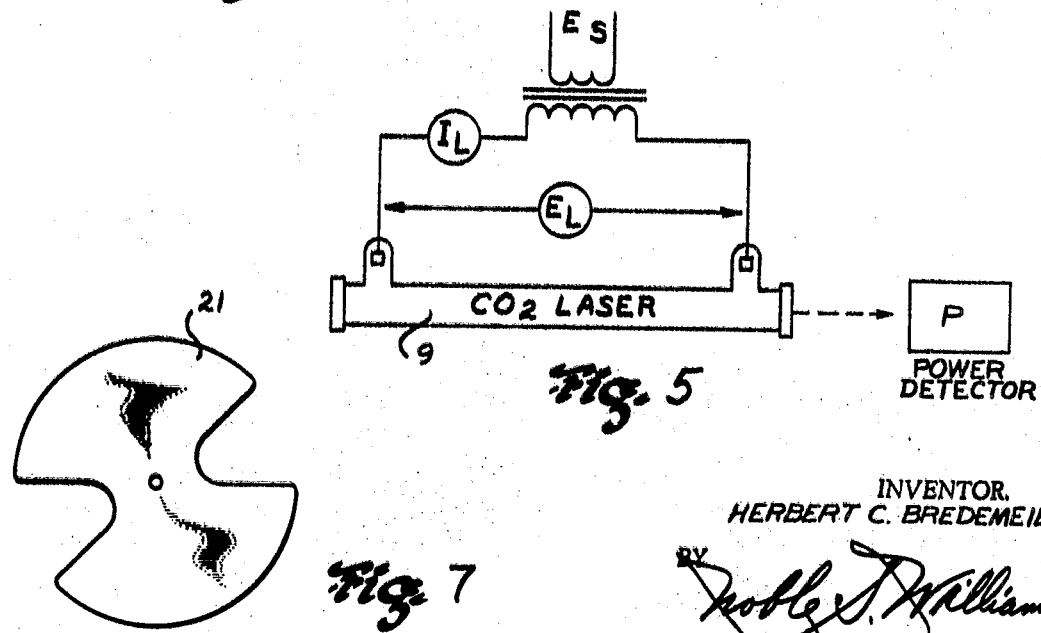
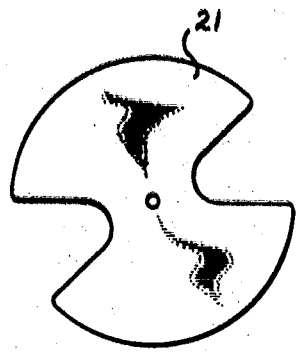
INVENTOR.
HERBERT C. BREDEMEIER
ATTORNEY Patented May 2, 1972

INVENTOR.
HERBERT C. BREDEMEIER

BY Noble J. Williams
ATTORNEY

Patented May 2, 1972
3,659,613
3 Sheets-Sheet 3
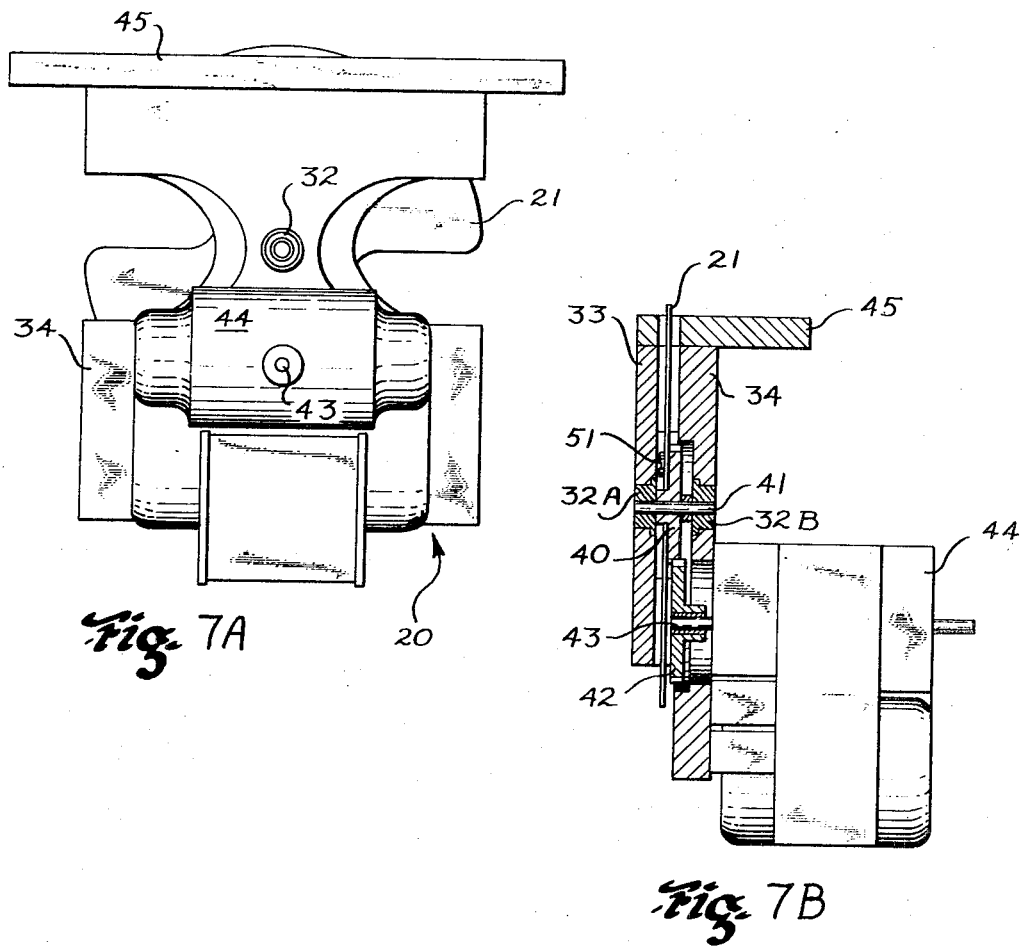
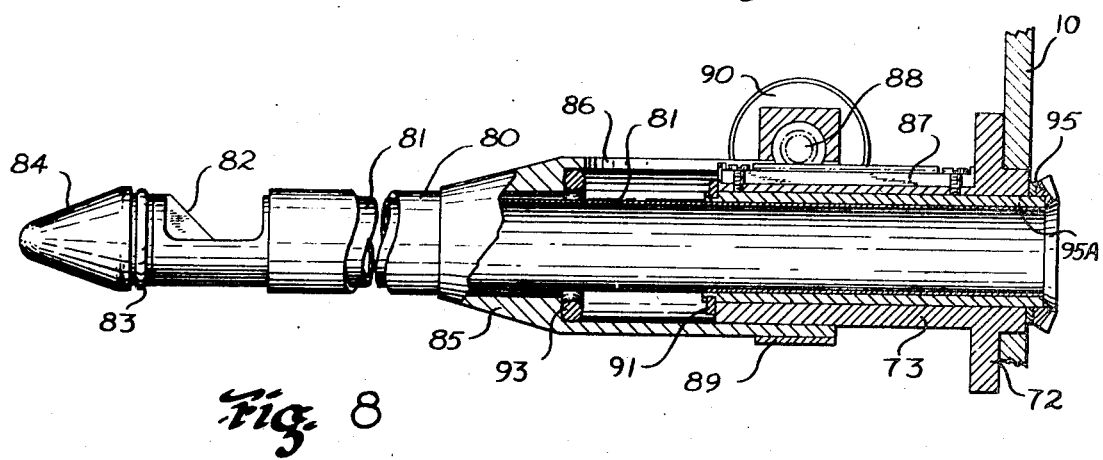
INVENTOR.
HERBERT C. BREDEMEIER
BY Noble S. Williams
ATTORNEY 3,659,613

LASER ACCESSORY FOR SURGICAL APPLICATION

BACKGROUND

The purpose of the device described herein is to deliver energy from a laser to relatively inaccessible locations while simultaneously observing and illuminating the target site. In particular, it is designed to direct the 10.6 micron wavelength beam of a $CO_2$ laser down a metal tube to sites within the body and thus to expose selected tissue to the laser radiation for excision or therapeutic purposes and without conventional surgical intervention.

Previous methods involved the insertion of surgical instruments for cutting, burning, freezing or otherwise destroying tissue by physical contact. These older methods involve undesirable bleeding, poor control of damage and poor or no real-time visualization and illumination.

By employing the $CO_2$ laser beam for surgery, one takes advantage of an ability to direct and control the application of relatively large dosages of infra-red energy to sharply delineated sites. At the same time, however, it becomes necessary to allow for the limitations of currently available materials simultaneously to transmit radiation at wavelengths of between approximately 0.4 to 0.7 micron (visible) and 10.6 microns (infra-red), handle the high power in the $CO_2$ laser beam substantially without waste of any part of the laser energy, and perform over a reasonable lifetime in a hospital environment. To meet these conflicting requirements, it is necessary to employ only reflective optical components in the path of the laser beam while reflective and transmissive elements can be used to manipulate visible light. For further background on the use of a laser for surgery, the reader is referred to Yahr, William Z., M.D., and Strully, Kenneth J., M.D., "Blood Vessel Anastomosis by Laser and Other Biomedical Applications," The Journal of the Association for the Advancement of Medical Instrumentation, September/October 1966. However, it might be of interest to here note that a $CO_2$ laser in addition to providing a high power output also has the advantage of having substantially all of its 10.6 micron radiation absorbed by body tissues; a condition not obtained when laser energy from other sources such as ruby, for example at 6,943 millimicrons is employed.

OBJECT OF THE INVENTION

It is an object of this invention to provide endoscope-gastroscope construction especially adapted for use with a $CO_2$ surgical laser.

THE DRAWINGS

FIGS. 1–4 are a series of schematic diagrams indicating voltage input and pulsed $CO_2$ laser operating on ac power output in a $CO_2$ surgical laser;

FIG. 5 is a schematic circuit diagram of the power hook-up for a $CO_2$ surgical laser;

FIG. 7 is a plan view of a chopper disc used in the arrangement of FIG. 6;

FIG. 7A is a plan view of the chopper assembly including the chopper disc;

FIG. 7B is a side elevation, in partial section, of the arrangement of FIG. 7A; and FIG. 8 is a side elevational view, in partial section, with some parts broken away, of a gastroscope tube construction for the $CO_2$ laser accessory construction of the invention;

FIGS. 5 through 8 (but not 6A) are reproductions of parts of scale drawings and thus comparative element size is shown.

DETAILED DESCRIPTION OF INVENTION

With the $CO_2$ laser, accurate dosage of radiation and control of area of application to biological tissues are essential requirements. Further, it is desirable that the instrument be of relatively small size, of high reliability, but be simple to operate. An exemplary laser which meets these requirements, and which is presently available, has a multimode power output to a manipulator of about 75 watts, and a useful output from the manipulator of 50 watts in a multimode beam. A flowing gas system and an A.C. power supply are used for maximum reliability and simplicity. The major components are the gas discharge tube and an optical cavity approximately 1.5 meters long. It is associated with necessary valving, gauging, and pumping devices and an electrical system containing a high-voltage transformer and control circuits. There is included a timing device and a beam manipulator. The beam manipulator uses reflecting mirrors throughout to allow for manipulation of the energy output. The present invention is especially concerned with such a commercially available device. It is an accessory which may be used to deliver the pulsatile laser beam from such a laser apparatus to remote locations which are accessible through body openings. In one aspect, it is an endoscope. An endoscope is defined as an instrument for visualizing the interior of a hollow organ such as the rectum or esophagus. In another aspect, the arrangement of the invention is applicable as a gastroscope. A gastroscope is defined as an instrument for viewing the interior of the stomach.

The endoscope of this invention is a time-sharing device which takes advantage of the fact the infra-red energy from a $CO_2$ laser with A.C. power supply is pulsatile and actually emitted as a series of pulses occurring, for example, at a frequency twice that of a conventional 60 hz power source. (It should be appreciated, however, that other frequencies both faster and slower, within a relatively wide range, are also useful. Of course, preferably, the frequency should not be so slow as to cause flicker from the area being observed by the surgeon.) Note FIGS. 1 through 5 and especially FIGS. 1 through 4 which indicate the character of the source voltage, laser voltage, laser current, and laser output power with time. Note the pause or free time between adjacent energy pulses from the laser. Short periods of illumination and viewing by the surgeon are timed to occur between the pulses of laser energy, and because of the 120 hz repetition rate, all visual phenomena appear continuous and simultaneous to the eye. Time-sharing in this way makes it possible for the line of sight, illuminating light and the laser beam to follow a common path and be directed down a single tube to a target site.

Figure 6:
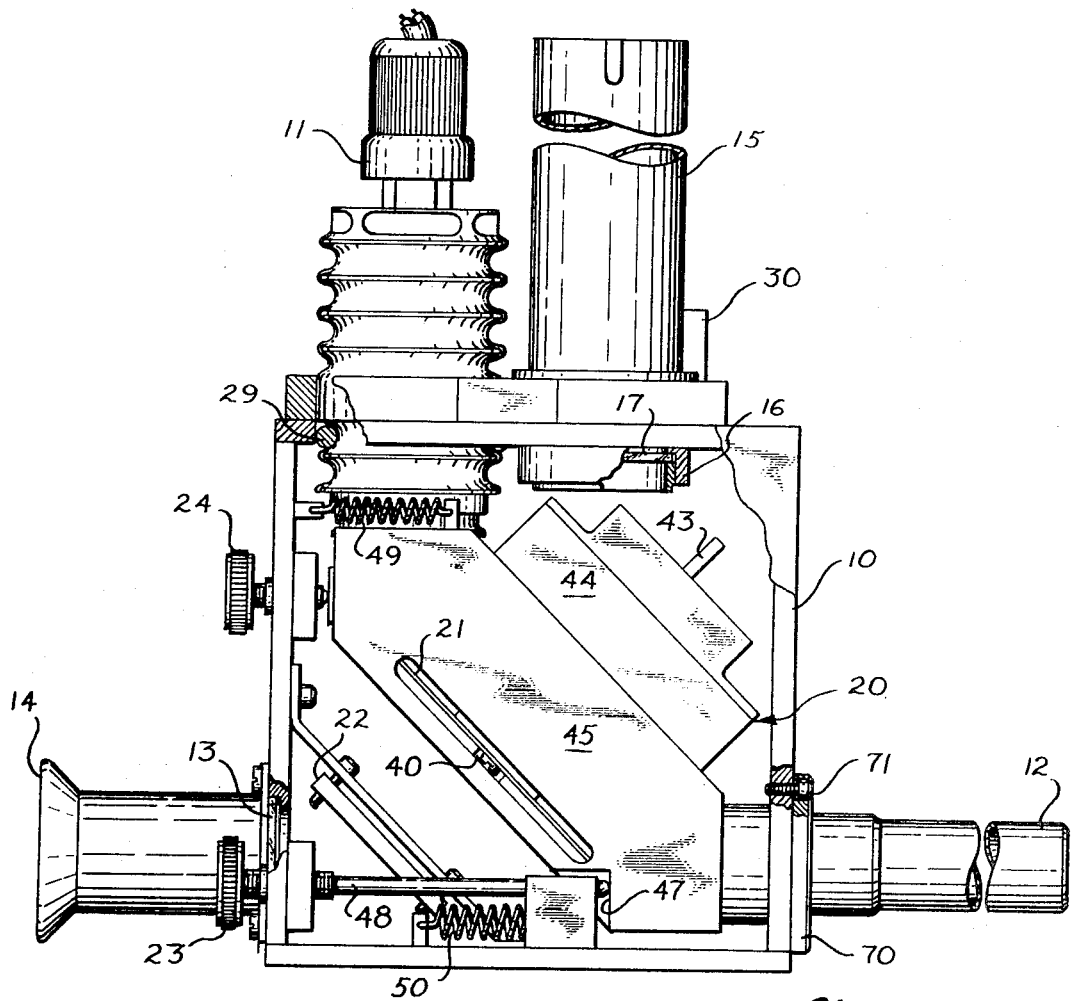
FIG. 6 is a side elevational view, partly broken away and partly in section showing a laser endoscope construction according to this invention.

The principal components of the endoscope system are shown in FIG. 6. The system is comprised of an outer housing 10 having a conventional microscope-type illuminator assembly 11 at the top and at the bottom a probe or tube 12 optically aligned with a viewing window 13 and a suitable eyepiece 14. Adjacent the illuminator 11 is a tube 15 arranged for interconnection with a manipulator arm of a $CO_2$ laser such as shown at 9 in FIG. 5. At the bottom of the tube 15 in a suitable mounting 16 is a lens 17.

In the path of the laser output is a reflective-chopper-disc-and-synchronous-motor assembly 20. This assembly is arranged to rotate the chopping disc 21 in synchronization with the output of the laser.

In optical alignment with the window 13 and the central axis of the tube 12 is a conventional beam splitter 22. The chopper 21 and its related motor and mounting assembly is adjustable as by extending and retracting the shafts associated with thumb screws 23 and 24 to assure alignment. There is a third such screw (not shown) on the other side of the assembly.

In operation, each pulse of laser energy is intercepted by a reflective portion of the chopper disc which is rotating synchronously in its path. There is substantially no loss of energy by this reflection. The energy is thus reflected from the chopper disc down tube 12. Those losses which do occur as a result of chopping are in the visible light path only and are easily compensated for by using an intense light. The practical use of the lens 17 is to focus energy near the distal end of the tube 12. An external air supply is directed through tube 30 to the housing 10 and thus down the tube 12 to purge the worksite of smoke. An O-ring 29 seals the opening through which the illuminator assembly 11 extends.

Referring for the moment to FIGS. 7A and 7B, the reflective-chopper-disc-and-synchronous-motor assembly 20 is shown in more detail. The disc 21 is mounted on a spindle 40 having a central axle 41 journaled in bearings 32A and 32B carried by walls 33 and 34. The disc is mounted as by screws 51 on the spindle 40. The circumference of the spindle 40 is geared and arrange to mesh and be driven by the gear 42. The gear 42 is mounted on a shaft 43 arranged to be driven by the electrical motor 44. In a preferred embodiment, we use a Barber-Colman KYAJ 622-328 model motor which is an AC synchronous motor of polarized type. Thus, when the disc 21 is suitably factory assembled upon motor-driven shaft 40 and adjusted to have proper phase relation to the pulsed output of the laser operating from the same AC source as the motor, the synchronous operation of disc 21 and the output pulses of said laser is assured.

The arrangement of FIGS. 7A and 7B includes a side wall plate 45 to which walls 33 and 34 are secured and against the back edge of which bears the distal end of the threaded shaft turned by thumb screw 24. This side wall plate 45 is also seen in FIG. 6. Suitable screw fasteners hold the wall parts together. Note a portion of the wall plate 45 is notched at 47 and is arranged to be pressed against by the distal end of the shaft 48 which is turned by thumb screw 23. There is a comparable assembly (not shown) which bears against a notch in wall 34. The chopper assembly 20 is spring-biased against the action of the thumb screws 23 and 24 by springs 49 and 50 in a conventional manner.

Figure 6A:
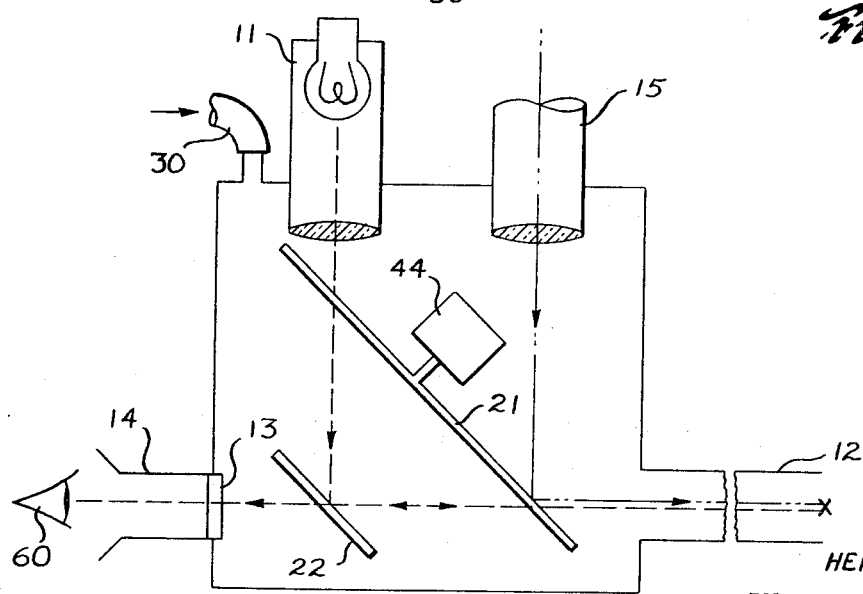
FIG. 6A is a schematic view of the arrangement of FIG. 6 with some parts omitted to better show the optical interaction of parts.

In operation (refer to FIG. 6A) the microscope illuminator 11, by means of the beam splitter 22, illuminates the target X for the viewer 60. The optical path of the viewer is obstructed rather in the manner of a stroboscope each time the laser output is directed against the target by the reflecting portions of the disc 21.

Referring now to FIG. 8, there is shown means for converting the endoscope to a gastroscope by replacing endoscope probe or tube 12 with a longer and more specialized arrangement. For use of the arrangement of FIG. 8, the fitting 70 and tube 12 are removed from the housing 10 as by removing screws 71. A replacement element or mounting 72 is attached to the housing. The fitting or mounting 72 includes an outwardly extending, cylindrically cross-sectioned socket 73. A pair of concentric tubes 80 and 81 are mounted on the socket 73. The tube 81 is arranged to move relative to tube 80 to periodically expose a mirror 82. An O-ring 83, mounted in a suitable groove about the circumference of the tube 81 is arranged to seal the mirror when the tube 80 is telescoped forwardly over the O-ring. The distal end of the tube 81 includes a smooth somewhat conical portion 84 for ease of insertion into the body cavity to be examined.

Mounted about the other end of the tube 80 as by swaging or the like is the cylindrical housing 85. The housing 85 has an elongated slot or aperture 86 formed through an upper portion thereof to provide access to the rack 87. The rack 87 is in operable engagement with the pinion 88. The pinion 88 is held in a clamp 89 mounted circumferentially of the housing 85. By suitable manipulation of thumb screw 90, one is thus able to extend and retract the outer tube 80 thereby exposing and closing the end of the gastroscope. There is further provided a silicone rubber gasket 93 which provides a seal between parts 73 and 85 to prevent loss of pressurizing air when tube 80 is retracted. A C-shaped metallic retaining ring 91 is disposed about tubular part 95A in an annular groove in the distal end thereof for retaining these parts in position.

In addition, it is desirable to provide for rotation of the inner tube 81 about its central axis. To this end, a bevel gear 95 is fixedly carried on a tubular part 95A which is mounted about the end of the tube 81 where it enters the housing 10 and these parts 95A and 81 are fixedly secured so as to rotate together with gear 95. There provided an additional mating bevel gear mounted on an adjustable shaft extending through a wall of the housing 10. To maintain drawing simplicity, such has been omitted from the showing of FIG. 6.

In operation, the mirror 82 reflects a de-focused laser beam toward a target. The gearing associated with the inner tube enables an operator to manipulate the beam as he simultaneously views and irradiates such as the mucosal lining of the stomach. The outer tube lends support to the inner tube and acts as a retractable sheath covering the mirror as the gastroscope is passed down the esophagus. The pressurizing air mentioned earlier in connection with the endoscope is used in this case to distend the stomach and thus optimize conditions for tissue irradiation. An inflatable rubber cuff, a standard surgical device, can be slipped over the outer tube to minimize loss of pressurizing air through the esophagus.

Models of this endoscope and gastroscope have been successfully used in animal experiments to irradiate canine vocal cords and the interior of the canine stomach. Accurate dosage of the laser radiation was readily achieved by virtue of the illumination and simultaneous visualization.

Having thus described the invention in detail and with sufficient particularlity as to enable those skilled in the art to practice it, what is desired to protected by Letters Patent is set forth in the following claims.

I claim:

1. The combination comprising a $CO_2$ laser, alternating current means for energizing said laser to cause same to emit successive pulses of laser energy substantially at 10.6 microns wavelength in timed relation to the frequency of said alternating current means, base support means, an elongated tubular member defining therethrough an unobstructed path for optical energy being directed to a body cavity location, the proximal end of said elongated tubular member being attached to said base support means, optical means including a totally reflective mirror for directing said $CO_2$ laser energy along an optical path through said tubular member to said body cavity location, said optical path being essentially collinear with the axis of said elongated tubular member, a synchronous motor arranged to be energized by said alternating current means and attached to said base support means, said totally reflective mirror being in the form of a rotatable chopper disc operatively connected to said synchronous motor, said chopper disc having a plurality of regularly circumferentially spaced reflective portions successively positioned, during rotation of said disc, in said optical path in such a manner as to reflect said laser light when incident thereon along said optical path to said body cavity location, a source of visible light operatively associated with said base support means, beam-splitting means attached to said base support means and positioned so as to direct said visible light to said body cavity location along that portion of said optical path extending from said chopper disc to said body cavity location, the spaces between said reflective portions of said chopper disc serving to allow said visible light from said beam-splitting means to pass therethrough and travel along said portion of said optical path to said body cavity location, and to allow visible light reflected from an object or material at said body cavity location to travel in the opposite direction through said tubular member and to an observer's location which is positioned outwardly of said disc and beam-splitting means, said rotatable chopper disc being so angularly positioned and phased relative to the shaft of said synchronous motor and said synchronous motor being rotated at such a frequency as to have the reflective portions of said chopper disc intercept each successive laser pulse and direct same at substantially full strength along said optical path to said body cavity location while, in effect, enabling a person at said observer's location to view and monitor said body cavity location by visible light transmitted through said spaces and reflected from said object or material substantially free from flicker.

2. The combination defined in claim 1 and wherein said base support means comprises a substantially air-tight housing which is connected to the proximal end of said tubular member and surrounds said optical means and said beam-splitting means, and is provided with an inlet for air under pressure, said tubular member being open at its distal end so as to enable said air to pass into said body cavity location and to extend body cavity tissues and purge when necessary said body cavity location of smoke and moisture in the vicinity of tissue or the like being treated by laser radiation.

3. The combination defined in claim 1 and wherein a second tubular member is carried by the first-mentioned tubular member, and has mounted near its distal and reflecting means arranged to direct laser energy outwardly at a preselected controllable angle into said body cavity location.

4. The combination defined in claim 3 and wherein said second tubular member is telescopically extensive relative to said first tubular member so as to locate said reflecting means at different distances within said body cavity location.

5. The combination defined in claim 1 wherein said chopper disc has two regularly circumferentially spaced reflective portions so that the laser pulses directed to said body cavity location have a repetition rate of twice the frequencies of the alternating current means or said laser and said synchronous motor.

* * * * *